Dec. 27, 1938.  W. H. SCHRAY  2,141,881
BASKET CARRYING CART
Filed March 21, 1938
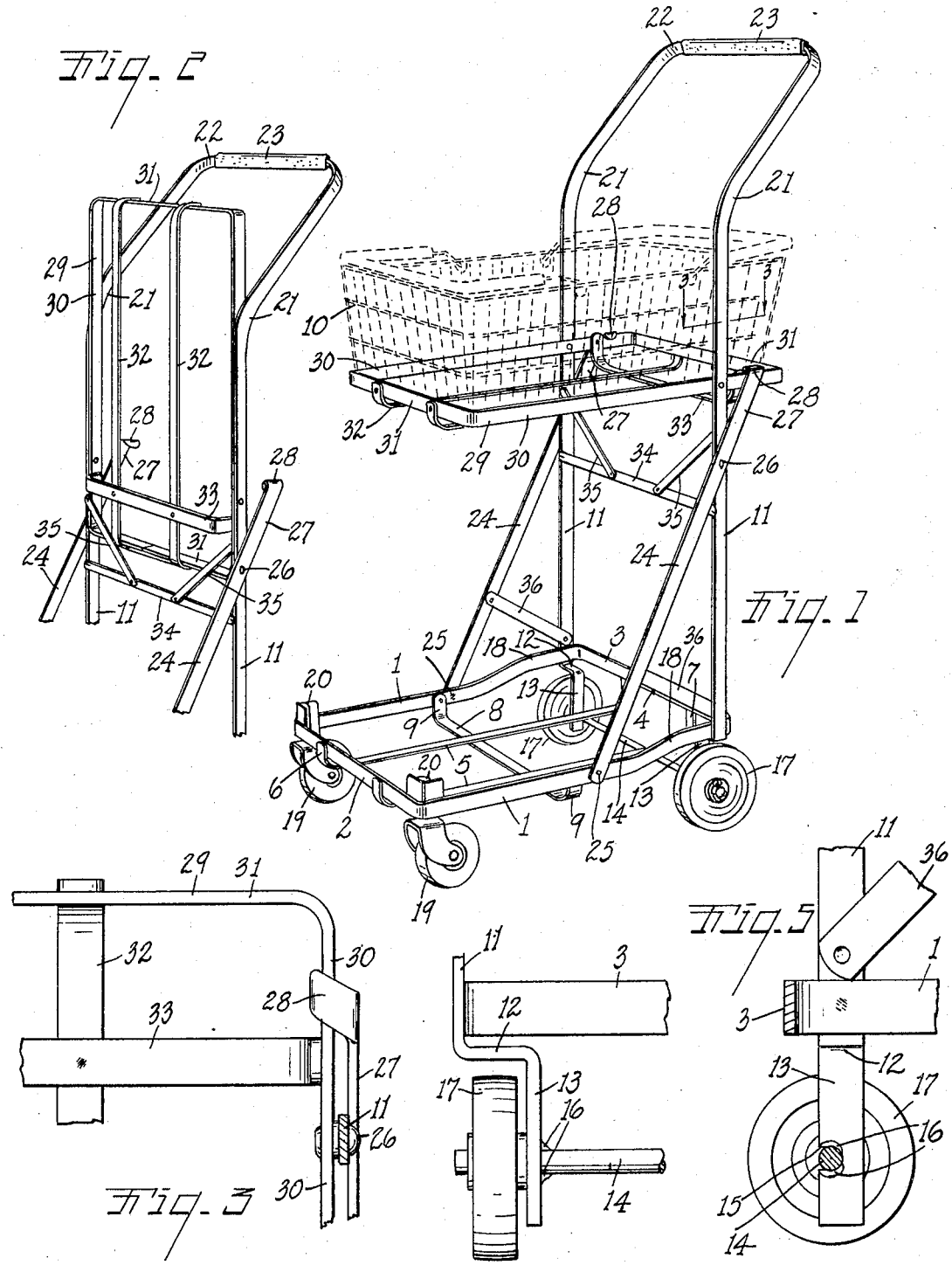
INVENTOR.
Walter H. Schray
BY Earl D. Chappell
ATTORNEYS Patented Dec. 27, 1938

2,141,881

UNITED STATES PATENT OFFICE 2,141,881

BASKET CARRYING CART

Walter H. Schray, Battle Creek, Mich., assignor to United Steel and Wire Company, Battle Creek, Mich., a corporation of Michigan Application March 21, 1938, Serial No. 197,171

8 Claims. (Cl. 280—36)

The main objects of this invention are:

First, to provide a cart or carriage which is well adapted for use as a basket carrier—for example for the use of customers in a self-serve store or the like.

Second, to provide a cart or carriage of the type described in which there are no projecting portions that are likely to cause injury to the user or other persons while the cart is being handled and moved about.

Third, to provide a structure of this character with a collapsible shelf or holder which when collapsed is entirely out of the way.

Fourth, to provide a structure having these advantages which is very economical to produce and at the same time is strong and rigid and durable even when formed of relatively light material.

Objects relating to details and economies of construction and operation of the invention will appear from the description to follow. The invention is defined and pointed out in the claims.

A preferred embodiment of the invention is illustrated in the accompanying drawing, in which:

Fig. 1 is a perspective view of my improved cart or carriage with the upper shelf or holder in erected position and a basket shown thereon by dotted lines.

Fig. 2 is a fragmentary view showing the shelf or holder in collapsed position.

Fig. 3 is an enlarged fragmentary view in section on line 3—3 of Fig. 1.

Fig. 4 is a fragmentary rear elevation.

Fig. 5 is a fragmentary view partially in vertical section showing the mounting for the wheel axle and other structural details.

In the embodiment of my invention illustrated, the base frame comprises side members 1, 1, and front and rear end members 2, 3, these being preferably formed integrally of flat stock bent into the desired shape, the ends of the stock being welded or otherwise secured together at 4.

I provide a skeleton bottom consisting of longitudinal pieces 5 having upturned ends 6 and 7 secured to the front and rear end pieces respectively, the cross piece 8 having upturned ends 9 secured to the side pieces of the base frame. This provides a suitable support for a basket or receptacle such as is indicated at 10 on the shelf later to be described.

I provide uprights 11 which are secured to the side members of the frame at their rear ends and extended downwardly below the frame and inwardly offset at 12 to provide axle hangers 13.

The axle 14 is carried by these hangers which are preferably notched at 15 to receive the axle, the axle being secured therein by welding as indicated at 16. The wheels 17 are arranged on the axle and below the upwardly rear portions 18 of the side members. These side members of the base frames are upwardly offset so that the wheels can be positioned under the side members and thereby are guarded and shielded. The caster wheels 19 are mounted in suitable socket members 20 angled to fit in the front corners of the base frame. The uprights 11 are bent rearwardly at 21 and connected to provide the handle bar 22 which in this instance is provided with a suitable grip covering 23.

The rearwardly inclined braces 24 are secured to the side members of the base frame at 25 and to the uprights at 26. These braces have portions 27 extending upwardly and rearwardly beyond the point of connection to the uprights and terminate in upwardly hook-like stops 28.

The shelf or holder designated generally by the numeral 29 comprises side members 30 and end members 31 with suitable longitudinal and cross pieces 32 and 33 forming a suitable rest for a basket as 10. This shelf or holder is adapted to be swung to a horizontal position as shown in Fig. 1 with its side members in supporting engagement with the stops 28 or it may be swung to a collapsed upright position as shown in Fig. 2 in which position it is entirely out of the way. The uprights are connected by a cross piece 34. The cross piece is further connected to the uprights by the braces 35.

The braces or struts 24 are reinforced by the downwardly and rearwardly inclined braces 36 which are connected to the uprights at a point adjacent the frame and to the braces at a point substantially above their point of connection to the frame. This of course is merely a matter of providing the desired strength and rigidity.

I have illustrated and described my improvements in a very practical embodiment. The wheels are so mounted that they are not likely to be brought into contact with show-cases, racks, or other fixed objects in a store or to injure either the person operating the cart or other customers in the store. The structure is comparatively light and easily operated and at the same time is strong and durable.

I have not attempted to illustrate or describe other adaptations or modifications of my invention as it is believed that this disclosure will enable those skilled in the art to embody or adapt my improvements as may be desired.

Having thus described my invention, what I claim as new and desire to secure by Letters Patent is:

1. In a cart, the combination of a base frame comprising integral side and end members, the side members having upwardly offset portions at their rear ends, a bottom comprising longitudinal and cross pieces carried by said base frame side and end members, uprights secured to the rear ends of said frame side members and having inwardly offset portions projecting below the side members constituting axle hangers, the upper ends of said uprights being bent rearwardly and connected providing a handle bar, an axle carried by said axle hangers, wheels on said axle arranged on the outer sides of said axle hangers and below the upwardly offset rear portions of said base frame side members, caster wheels provided with caster sockets secured within the forward angles of said base frame, rearwardly inclined braces connected to the side members of said base frame and to said uprights, the upper ends of said braces being extended upwardly and rearwardly and terminating in inturned stops, and a receptacle holder pivotally mounted between said uprights and adapted to be swung upwardly to an upright collapsed position between the uprights or to be swung to a horizontal operative position in supporting engagement with said stops on said braces.

2. In a cart, the combination of a base frame comprising integral side and end members, the side members having upwardly offset portions at their rear ends, a bottom comprising longitudinal and cross pieces carried by said base frame side and end members, uprights secured to the rear ends of said frame side members and having inwardly offset portions projecting below the side members constituting axle hangers, the upper ends of said uprights being bent rearwardly and connected providing a handle bar, an axle carried by said axle hangers, wheels on said axle arranged on the outer sides of said axle hangers and below the upwardly offset rear portions of said base frame side members, and caster wheels provided with caster sockets secured within the forward angles of said base frame.

3. In a cart, the combination of a base frame comprising side members having upwardly offset portions at their rear ends, uprights secured to the rear ends of said frame side members and having inwardly offset portions projecting below the side members constituting axle hangers, the upper ends of said uprights being provided with a handle bar, an axle carried by said axle hangers, wheels on said axle arranged on the outer sides of said axle hangers and below the upwardly offset rear portions of said base frame side members, rearwardly inclined braces connected to the side members of said base frame and to said uprights, the upper ends of said braces being extended upwardly and rearwardly and provided with stops, and a receptacle holder pivotally mounted between said uprights and adapted to be swung upwardly to an upright collapsed position between the uprights or to be swung to a horizontal operative position in supporting engagement with said stops on said braces.

4. In a cart, the combination of a base frame comprising side members having upwardly offset portions at their rear ends, uprights secured to the rear ends of said frame side members and having inwardly offset portions projecting below the side members constituting axle hangers, the upper ends of said uprights being provided with a handle bar, an axle carried by said axle hangers, and wheels on said axle arranged on the outer sides of said axle hangers and below the upwardly offset rear portions of said base frame side members.

5. In a cart, the combination of a base frame comprising integral side and end members, the side members having upwardly offset portions at their rear ends, a bottom comprising longitudinal and cross pieces carried by said base frame side and end members, uprights secured to the rear ends of said frame side members and having inwardly offset portions projecting below the side members constituting axle hangers, the upper ends of said uprights being bent rearwardly and connected providing a handle bar, an axle carried by said axle hangers, wheels on said axle arranged on the outer sides of said axle hangers and below the upwardly offset rear portions of said base frame side members, and caster wheels provided with caster sockets secured within the forward angles of said base frame.

6. In a cart, the combination of a base frame comprising side members having upwardly offset portions at their rear ends, uprights secured to the rear ends of said frame side members and having inwardly offset portions projecting below the side members constituting axle hangers, the upper ends of said uprights being bent rearwardly and connected providing a handle bar, an axle carried by said axle hangers, and wheels on said axle arranged on the outer sides of said axle hangers and below the upwardly offset rear portions of said base frame side members.

7. In a cart, the combination of a base frame comprising side members having upwardly offset portions at their rear ends, uprights secured to the rear ends of said side members and having inwardly offset portions projecting below the side members constituting axle hangers, the upper ends of said uprights being bent rearwardly and connected providing a handle bar, an axle carried by said axle hanger, and wheels on said axle arranged on the outer sides of said axle hanger and below the upright offset rear portion of said base frame side members.

8. In a cart, the combination of a wheeled base, uprights on said base provided with a handle bar, rearwardly inclined braces connecting said uprights to said base, the upper ends of said braces being extended rearwardly of the uprights and provided with stops, and a receptacle holder pivotally mounted on said uprights and adapted to be swung upwardly to an upright collapsed position between the uprights or to be swung to an operative position in supporting engagement with the stops on said braces.

WALTER H. SCHRAY.